United States Patent
Xu et al.

(10) Patent No.: US 12,181,380 B2
(45) Date of Patent: Dec. 31, 2024

(54) DETECTION APPARATUS AND SERVER

(71) Applicant: Huawei Technologies Co., Ltd., Shenzhen (CN)

(72) Inventors: Weiqiang Xu, Dongguan (CN); Xiaochu Li, Dongguan (CN); Yimin Yao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 17/840,347

(22) Filed: Jun. 14, 2022

(65) Prior Publication Data

US 2022/0307947 A1 Sep. 29, 2022

Related U.S. Application Data

(63) Continuation of application No. PCT/CN2020/115997, filed on Sep. 17, 2020.

(30) Foreign Application Priority Data

Dec. 16, 2019 (CN) .......................... 201911293639.2

(51) Int. Cl.
*G01K 3/10* (2006.01)
*G01M 3/18* (2006.01)
(Continued)

(52) U.S. Cl.
CPC .............. *G01M 99/008* (2013.01); *G01K 3/10* (2013.01); *G01M 3/18* (2013.01); *G01M 13/003* (2019.01); *H01F 7/08* (2013.01)

(58) Field of Classification Search
CPC ........... G01K 1/022; G01K 3/10; G01M 3/18; G01M 13/003; G01M 99/008; H01F 7/08
See application file for complete search history.

(56) References Cited

U.S. PATENT DOCUMENTS 5,086,829 A * 2/1992 Asakawa ........... H05K 7/20281
361/699
5,174,364 A * 12/1992 Mizuno .................. G05D 23/24
361/699
(Continued)

FOREIGN PATENT DOCUMENTS

CN 2517747 Y 10/2002
CN 1416202 A 5/2003
(Continued)

OTHER PUBLICATIONS

Machine Translation of CN 106546420 (Year: 2024).*
(Continued)

*Primary Examiner* — Eric S Ruppert
*Assistant Examiner* — Hans R Weiland
(74) *Attorney, Agent, or Firm* — Leydig, Voit & Mayer, Ltd.

(57) ABSTRACT

A detection apparatus and a server are provided, where the apparatus is configured to detect whether a coolant heat pipe or a solenoid valve on the coolant heat pipe in a device is abnormal, and the apparatus includes a control chip. The control chip can control a working state of the solenoid valve. The control chip can further obtain a temperature of a component in the device. When it is detected whether the coolant heat pipe or the solenoid valve is abnormal, the control chip may obtain a temperature difference of the component in the device when the working state of the solenoid valve is controlled, and relatively conveniently determine whether the coolant heat pipe or the solenoid valve is abnormal based on the temperature difference.

18 Claims, 5 Drawing Sheets

(51) Int. Cl.
*G01M 13/003* (2019.01)
*G01M 99/00* (2011.01)
*H01F 7/08* (2006.01)

(56) References Cited

U.S. PATENT DOCUMENTS

| | | | |
|---|---|---|---|
| 5,333,676 A | 8/1994 | Mizuno | |
| 2010/0031646 A1 | 2/2010 | Iwase et al. | |
| 2012/0123595 A1* | 5/2012 | Bower, III | H05K 7/20772 |
| | | | 700/282 |
| 2016/0161952 A1* | 6/2016 | Buvid | G01M 3/18 |
| | | | 700/282 |

FOREIGN PATENT DOCUMENTS

| | | | | |
|---|---|---|---|---|
| CN | 102829991 A | | 12/2012 | |
| CN | 103104962 A | | 5/2013 | |
| CN | 103575514 A | | 2/2014 | |
| CN | 104048798 A | | 9/2014 | |
| CN | 104750210 A | * | 7/2015 | |
| CN | 106092446 A | | 11/2016 | |
| CN | 106122627 A | | 11/2016 | |
| CN | 106546420 A | | 3/2017 | |
| CN | 107271200 A | | 10/2017 | |
| CN | 107747789 A | | 3/2018 | |
| CN | 106122627 B | * | 1/2019 | ............ F16L 23/006 |
| CN | 106546420 B | * | 2/2019 | |
| CN | 109580216 A | | 4/2019 | |
| CN | 208888271 U | | 5/2019 | |
| CN | 110068758 A | | 7/2019 | |
| CN | 111025138 A | | 4/2020 | |
| JP | H07174662 A | | 7/1995 | |

OTHER PUBLICATIONS

Machine Translation of CN-104750210-A (Year: 2024).*
Machine translation of CN 106122627A, retrieved May 30, 2024 (Year: 2024).*
Cui Fengqing, "Development on Simulation Test Platform of HVDC Transmission Project Convevter Valve Cooling System," Zhengzhou University, School of Electrical Engineering, Total 76 pages (Nov. 2017). With an English abstract.

* cited by examiner

DETECTION APPARATUS AND SERVER

CROSS-REFERENCE TO RELATED APPLICATIONS

This application is a continuation of International Application No. PCT/CN2020/115997, filed on Sep. 17, 2020, which claims priority to Chinese Patent Application No. 201911293639.2, filed on Dec. 16, 2019. The disclosures of the aforementioned applications are hereby incorporated by reference in their entireties.

TECHNICAL FIELD

This application relates to the field of heat dissipation technologies, and in particular, to a detection apparatus and a server.

BACKGROUND

Currently, a liquid cooling heat dissipation apparatus mounted in a server drives coolant circulation in a heat pipe mainly by using a pump, absorbs heat from components (such as a processor and a graphics card) in the server, and dissipates heat inside the server to the outside, so as to reduce a temperature of each component in the server and ensure that each component can work normally at a proper temperature.

To be able to control a flowing condition of coolant in the heat pipe of the liquid cooling heat dissipation apparatus, a solenoid valve may be disposed on the heat pipe. When coolant in the heat pipe leaks, the coolant can be stopped from flowing in a timely manner in the heat pipe by controlling the solenoid valve.

However, an existing liquid cooling heat dissipation apparatus can only be used to detect a coolant leakage, but cannot perform a self-check on a heat pipe or a solenoid valve in the liquid cooling heat dissipation apparatus, and cannot ensure whether the heat pipe or the solenoid valve in the liquid cooling heat dissipation apparatus works normally, posing a potential safety hazard.

SUMMARY

This application provides a detection apparatus and a server, so as to detect a solenoid valve and a coolant heat pipe.

According to a first aspect, this application provides a detection apparatus, where the apparatus is configured to detect whether a coolant heat pipe or a solenoid valve on the coolant heat pipe in a device is abnormal, and the apparatus includes a control chip. The control chip can control a working state of the solenoid valve, for example, control the solenoid valve to be open or closed. The control chip can further obtain a temperature of a component in the device. When it is detected whether the coolant heat pipe or the solenoid valve on the coolant heat pipe is abnormal, the control chip may obtain a temperature difference of the component in the device when the working state of the solenoid valve is controlled, and determine whether the coolant heat pipe or the solenoid valve is abnormal based on the temperature difference.

According to the foregoing detection apparatus, the detection apparatus can determine the temperature difference of the component in the device when the working state of the solenoid valve is controlled, and then may determine whether the coolant heat pipe or the solenoid valve is abnormal based on the temperature difference, so as to achieve an effect of detecting the coolant heat pipe or the solenoid valve. The detection apparatus can directly obtain the temperature difference of the component in the device without disposing another temperature detection apparatus, thereby effectively reducing costs.

In an embodiment, the apparatus further includes a power supply circuit. The power supply circuit may supply power to the solenoid valve, and the control chip may control the working state of the solenoid valve by controlling a power supply state of the power supply circuit for the solenoid valve. Optionally, the power supply circuit may also supply power to the control chip.

According to the foregoing detection apparatus, the power supply state for the solenoid valve may be relatively conveniently controlled by using the power supply circuit. If the power supply circuit can supply power to the solenoid valve and the control chip simultaneously, the control chip and the solenoid valve may work simultaneously. If the power supply circuit is faulty, the control chip and the solenoid valve fail simultaneously, so that the control chip can always control the solenoid valve to avoid a case in which a unilateral failure of the two components (the control chip and the solenoid valve) causes the solenoid valve to be finally out of control.

In an embodiment, when detecting whether the coolant heat pipe or the solenoid valve on the coolant heat pipe is abnormal, the control chip may control the solenoid valve to change from an open state to a closed state, obtain a first temperature difference of the component in the device after a temperature of the component is stable, and then compare the first temperature difference with a first threshold. If it is detected that the first temperature difference is lower than the first threshold, it is determined that the solenoid valve is abnormal. If it is detected that the first temperature difference is higher than the first threshold, it is determined that the solenoid valve is normal.

According to the foregoing detection apparatus, the control chip can relatively conveniently determine whether the solenoid valve is abnormal by comparing the first temperature difference with the first threshold. This manner is simpler and more effective.

In an embodiment, when detecting whether the coolant heat pipe or the solenoid valve on the coolant heat pipe is abnormal, the control chip may control the solenoid valve to change from a closed state to an open state, obtain a second temperature difference of the component in the device after a temperature of the component is stable, and then compare the second temperature difference with a second threshold. If it is detected that the second temperature difference is lower than the second threshold, it indicates that there are one or more exceptions in the coolant heat pipe or the solenoid valve. If it is detected that the second temperature difference is higher than the second threshold, it is determined that the coolant heat pipe and the solenoid valve are normal.

According to the foregoing detection apparatus, the control chip can relatively conveniently determine whether the coolant heat pipe or the solenoid valve is abnormal by comparing the second temperature difference with the second threshold. This manner is simpler and more effective.

In an embodiment, when the power supply circuit supplies power to the solenoid valve, the solenoid valve is in an open state, and when the power supply circuit interrupts power to the solenoid valve, the solenoid valve is in a closed state. The solenoid valve is a normally closed solenoid valve. When the power supply circuit is damaged due to a leakage, the solenoid valve is closed in a timely manner to stop a flow of coolant in the coolant heat pipe in a timely manner. This setting of the solenoid valve can effectively prevent a leakage.

In an embodiment, when the power supply circuit interrupts power to the solenoid valve, the solenoid valve is in an open state, and when the power supply circuit supplies power to the solenoid valve, the solenoid valve is in a closed state. The solenoid valve is a normally opened solenoid valve, and a control manner of the solenoid valve is simpler. In this way, electric energy can also be saved effectively.

In an embodiment, after determining that the coolant heat pipe or the solenoid valve is abnormal, the control chip may send first alarm information to a system management module in the device, where the first alarm information is used to indicate that the coolant heat pipe or the solenoid valve is abnormal.

According to the foregoing detection apparatus, the control chip may notify the system management module in a timely manner that the coolant heat pipe or the solenoid valve is abnormal by using the first alarm information, so that the coolant heat pipe or the solenoid valve may be subsequently repaired. This avoids a potential safety hazard caused by an exception in the coolant heat pipe or the solenoid valve.

In an embodiment, the control chip may spontaneously detect the coolant heat pipe and the solenoid valve, or may detect the coolant heat pipe and the solenoid valve under an indication of the system management module. For example, the system management module may send a control signal to the control chip, and the control signal indicates the control chip to detect whether the coolant heat pipe and the solenoid valve in the device are abnormal. After receiving the control signal, the control chip detects the coolant heat pipe and the solenoid valve in the device, and obtains a temperature difference of the component in the device.

According to the foregoing detection apparatus, a plurality of manners of triggering the control chip to detect the coolant heat pipe and the solenoid valve can be implemented. The detection apparatus is applicable to a plurality of different application scenarios and has a wider application range.

In an embodiment, the apparatus further includes a detection coil, and the detection coil is configured to detect whether the coolant heat pipe in the device leaks; and the detection coil includes a first coil and a second coil that are connected in parallel. The control chip is further configured to detect a voltage difference between the first coil and the second coil, and may determine whether the detection coil is faulty by detecting the voltage difference between the first coil and the second coil.

According to the foregoing detection apparatus, in addition to having a function of detecting the coolant heat pipe and the solenoid valve, the control chip may further detect the detection coil and monitor a state of the detection coil, so as to ensure that the detection coil can work normally.

In an embodiment, the control chip detects a voltage difference between the first coil and the second coil when the first coil and the second coil are short-circuited, and sends second alarm information to the system management module if the voltage difference is not zero, where the second alarm information is used to indicate that the detection coil is faulty.

According to the foregoing detection apparatus, the control chip may notify the system management module in a timely manner that the detection coil is abnormal by using the second alarm information, so that the detection coil may be subsequently replaced or repaired, so as to ensure that the detection coil can work normally.

In an embodiment, when the control chip determines that the first coil and the second coil are short-circuited, a voltage difference between the first coil and the second coil is zero, indicating that the detection coil is not faulty. The control chip may send indication information to the system management module, where the indication information is used to indicate that the detection coil is normal.

According to the foregoing detection apparatus, the control chip may notify the system management module of a working state of the detection coil in a timely manner by using the indication information, so as to determine, based on the working state of the detection coil, that the detection coil can accurately detect whether the coolant heat pipe leaks.

In an embodiment, the control chip may further receive a leakage analog signal by using the detection coil, where the leakage analog signal is used to indicate that the coolant heat pipe leaks. The control chip may convert the leakage analog signal into a leakage digital signal, and send the leakage digital signal to the system management module, or may directly send third alarm information to the system management module, where the third alarm information indicates that the coolant heat pipe leaks.

According to the foregoing detection apparatus, the control chip can detect whether the detection coil is normal, and can further receive the leakage analog signal from the detection coil. When the control chip determines that the detection coil is normal, accuracy of the leakage analog signal may be further determined, so that whether the coolant heat pipe leaks can be accurately determined.

According to a second aspect, this application provides a server, where the server includes a component, a coolant heat pipe, a solenoid valve on the coolant heat pipe, and the detection apparatus according to any one of the first aspect or the possible designs of the first aspect.

DESCRIPTION OF EMBODIMENTS

Figure 1:
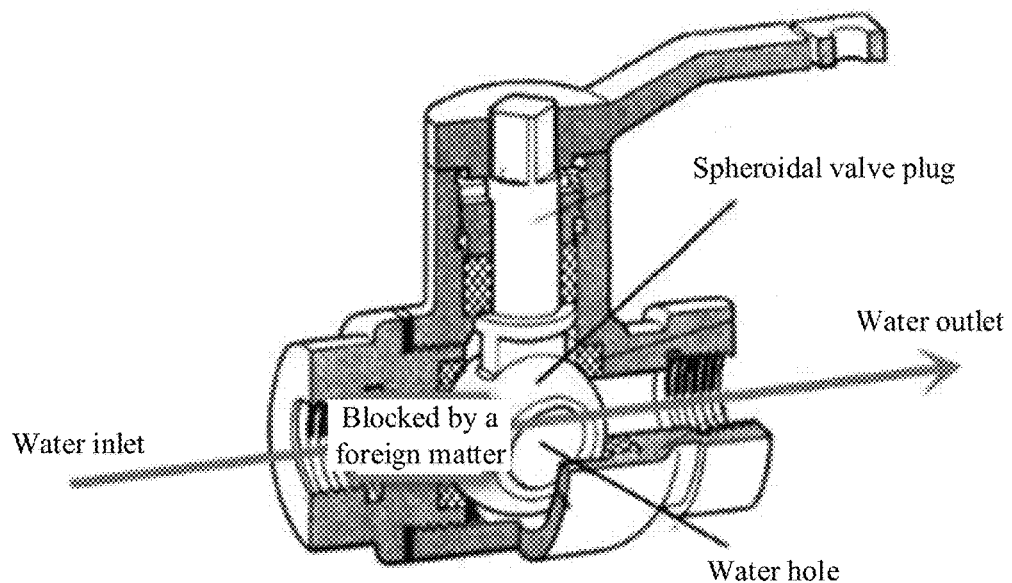
FIG. 1 is a schematic diagram of a structure of a solenoid valve.

FIG. 1 is a schematic diagram of a structure of a common solenoid valve. The solenoid valve is disposed on a coolant heat pipe. A direction indicated by an arrow in FIG. 1 is a flowing direction of coolant in the coolant heat pipe. One side of the solenoid valve is a water inlet and the other side is a water outlet. The solenoid valve includes a spheroidal valve plug. When the solenoid valve is closed, a closed part of the spheroidal valve plug faces the water inlet and the water outlet, blocking a flow of the coolant. When the solenoid valve is open, a water hole on the spheroidal valve plug faces the water inlet and the water outlet, and the coolant flows in the coolant heat pipe through the water hole.

However, if the solenoid valve is abnormal, an exception in the solenoid valve includes but is not limited to the following: the solenoid valve is damaged; and the solenoid valve is blocked by a foreign matter. For example, a foreign matter blocks the water hole of the solenoid valve. Even if the solenoid valve is open, coolant cannot pass through the water hole. Consequently, the coolant cannot flow through the coolant heat pipe, or a flow rate of coolant significantly decreases (for example, the foreign matter blocks only a part of the water hole). As a result, heat of each component in the device cannot be dissipated in a timely manner, posing a potential hazard.

The coolant heat pipe may also be abnormal. For example, a section of the coolant heat pipe is blocked by a foreign matter, or a section of the coolant heat pipe is broken. This cannot make the coolant flow well.

In view of this, an embodiment of this application provides a detection apparatus, configured to: detect a solenoid valve and a coolant heat pipe in a device, and detect whether the coolant heat pipe and the solenoid valve are abnormal. The detection apparatus includes a control chip. The control chip can control a working state of the solenoid valve, for example, control the solenoid valve to be open or closed, and can further obtain a temperature difference of a component in the device when the working state of the solenoid valve is controlled, and determine whether the coolant heat pipe or the solenoid valve is abnormal based on the temperature difference. In this embodiment of this application, the control chip can directly obtain the temperature difference of the component, and relatively conveniently determine whether the coolant flows by monitoring the temperature difference, so as to determine whether the coolant heat pipe or the solenoid valve is abnormal, thereby eliminating potential hazards in a timely manner.

Figure 2:
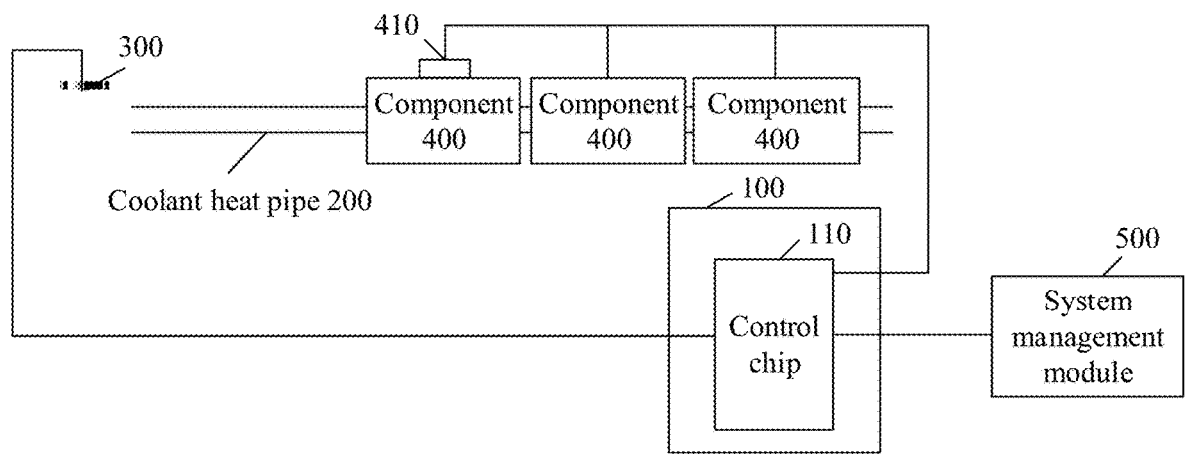
FIG. 2 is a schematic diagram of a structure of a detection apparatus according to this application.

The following describes the detection apparatus provided in this embodiment of this application with reference to accompanying drawings. FIG. 2 is a schematic diagram of a structure of a detection apparatus according to an embodiment of this application. A detection apparatus 100 is disposed in a device, and may detect whether a coolant heat pipe 200 or a solenoid valve 300 disposed on the coolant heat pipe 200 in the device is abnormal. The coolant heat pipe 200 may be disposed next to a component 400 to dissipate heat for the component 400.

The detection apparatus 100 includes a control chip 110. The control chip 110 may control a working state of the solenoid valve 300. In this embodiment of this application, the working state of the solenoid valve 300 includes being open and being closed.

When controlling a working state of the solenoid valve 300, the control chip 110 may further obtain a temperature difference of the component 400, and determine whether the coolant heat pipe 200 or the solenoid valve 300 is abnormal based on the temperature difference. A quantity of components 400 is not limited in this embodiment of this application, and may be one or more.

A type of the control chip 110 is not limited in this embodiment of this application. Any chip that can control a working state of the solenoid valve 300 and determine whether the coolant heat pipe 200 or the solenoid valve 300 is abnormal based on a temperature difference is applicable to this embodiment of this application.

The component 400 in the device generally has a function of detecting a temperature of the component 400, and can record a temperature change. The control chip 110 may directly obtain a temperature difference of the component 400 from the component 400. By using a temperature recording function of the component 400, the temperature difference may be obtained without adding another apparatus, thereby effectively reducing costs.

If the component 400 cannot record a temperature change, a temperature sensor 410 may be disposed on the component 400. The temperature sensor 410 may detect a temperature of the component 400, and the control chip 110 may obtain a temperature difference by using the temperature sensor 410 disposed on the component 400. A manner in which the temperature difference of the component 400 is obtained by disposing the temperature sensor 410 is applicable to various different devices and can effectively expand an application range.

The detection apparatus provided in this embodiment of this application may be applied to any device that includes a solenoid valve and a coolant heat pipe. For example, the detection apparatus may be applied to a server to detect the solenoid valve and the coolant heat pipe in the server.

A manner in which the control chip 110 controls a working state of the solenoid valve 300 is not limited in this embodiment of this application. For example, the control chip 110 may be connected to a system management module 500 in the device, and the system management module 500 may control a power supply state of a supply power for the solenoid valve 300. The control chip 110 may send a signal to the system management module 500, and the signal can drive the system management module 500 to control the power supply to supply or interrupt power to the solenoid valve 300.

The system management module 500 may be a baseboard management controller (BMC), a super input/output (SIO), or an embedded controller (EC). Herein, the system management module 500 may receive a signal from the control chip 110, and control the solenoid valve 300 to be open or closed based on an indication of the signal. The system management module 500 may control the power supply to supply or interrupt power to the solenoid valve 300 based on the indication of the signal.

Figure 3A:
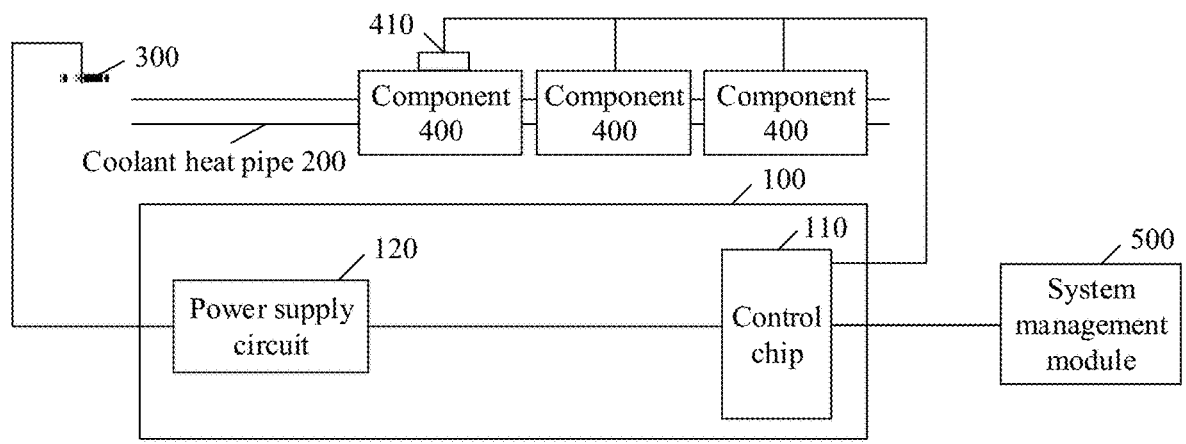
FIG. 3A and FIG. 3B are schematic diagrams of a structure of another detection apparatus according to this application.

For another example, as shown in FIG. 3A, the detection device 100 may include a power supply circuit 120 configured to supply power to the solenoid valve 300. The control chip 110 may be connected to the power supply circuit 120, and the control chip 110 may control a power supply state of the power supply circuit 120 for the solenoid valve 300, so as to control a working state of the solenoid valve 300.

Figure 3B:
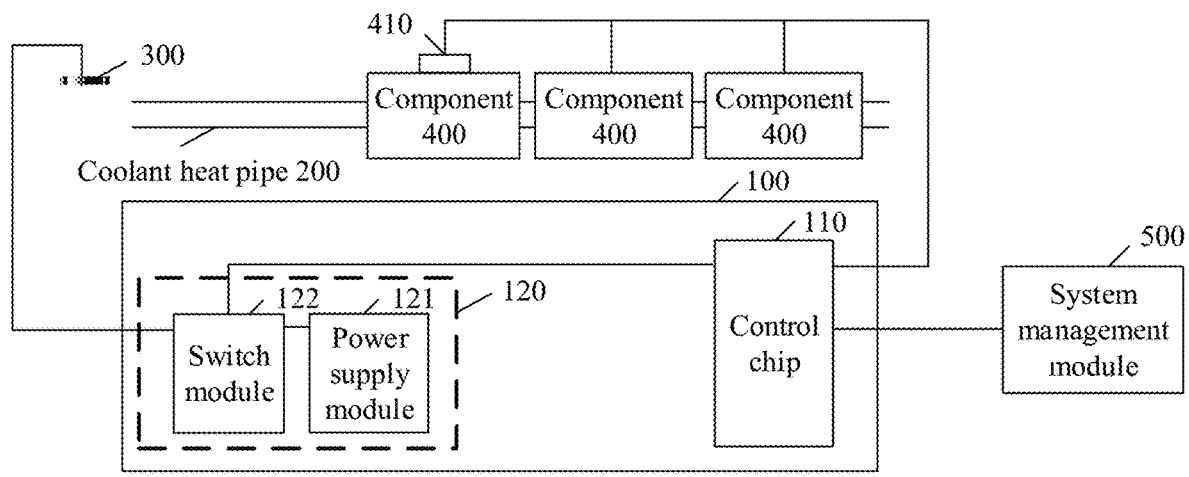

A specific composition of the power supply circuit 120 is not limited in this embodiment of this application. As shown in FIG. 3B, the power supply circuit 120 may include a power supply module 121 and a switch module 122. The power supply module 121 can provide power, and may be a power supply, or may be a power supply interface. A specific form of the power supply module 121 is not limited in this embodiment of this application. Any module that can provide power may be used as a power supply module 121. The switch module 122 is separately connected to the power supply module 121 and the solenoid valve 300, and is located on a power supply line between the power supply module 121 and the solenoid valve 300. The control chip 110 may be connected to the switch module 122.

The control chip 110 may control disconnection or closing of the power supply line between the power supply module 121 and the solenoid valve 300, so that the power supply module 121 supplies or interrupts power to the solenoid valve 300. A specific form of the switch module 122 is not limited in this embodiment of this application. The switch module 122 may be a common switch, or may be a transistor such as a triode or a metal oxide semiconductor (metal oxide semiconductor, MOS) transistor. The switch module 122 may be further a module including a plurality of transistors. Any device that can be controlled by the control chip 110 to disconnect or close a power supply line of the solenoid valve 300 is applicable to this embodiment of this application.

Based on closed states of the solenoid valve 300 when it is supplied with power, the solenoid valve 300 on the coolant heat pipe 200 may be categorized into two types: a normally opened solenoid valve and a normally closed solenoid valve.

For the normally opened solenoid valve, the solenoid valve is always in an open state when not being supplied with power, and is in a closed state when being supplied with power. When coolant flowing in the coolant heat pipe 200 needs to be blocked, the normally opened solenoid valve only needs to be supplied with power, so that the normally opened solenoid valve may be closed.

For the normally closed solenoid valve, the solenoid valve is always in a closed state when not being supplied with power, and is in an open state when being supplied with power. When coolant is circulated in the coolant heat pipe 200, the solenoid valve of this type needs to be consistently supplied with power to ensure that the solenoid valve of this type is always open. When the coolant flowing in the coolant heat pipe needs to be blocked, the normally closed solenoid valve needs to be stopped from being supplied with power, so that the normally closed solenoid valve is closed.

It should be noted that, because the normally closed solenoid valve needs to be in an open state for a long time, the normally closed solenoid valve needs to be consistently supplied with power. This may cause a situation in which the normally closed solenoid valve is overheated in a case of a long-term power supply. In this embodiment of this application, coolant in the coolant heat pipe may be used to dissipate heat for the normally closed solenoid valve, so as to ensure that the normally closed solenoid valve can work normally.

Optionally, the power supply circuit 120 may further supply power to the control chip 110. In other words, the solenoid valve 300 and the control chip 110 are supplied with power by using the same power supply circuit 120. When the power supply circuit 120 is faulty, not only the control chip 110 fails, but also the solenoid valve 300 cannot work normally. When the power supply circuit 120 is not faulty, both the control chip 110 and the solenoid valve 300 can work normally. There is no case in which one of the control chip 110 and the solenoid valve 300 fails and the other can work normally, so that the control chip 110 and the solenoid valve 300 can work simultaneously or fail simultaneously. Therefore, the control chip 110 under a normal working condition can always control a working state of the solenoid valve 300.

Figure 4:
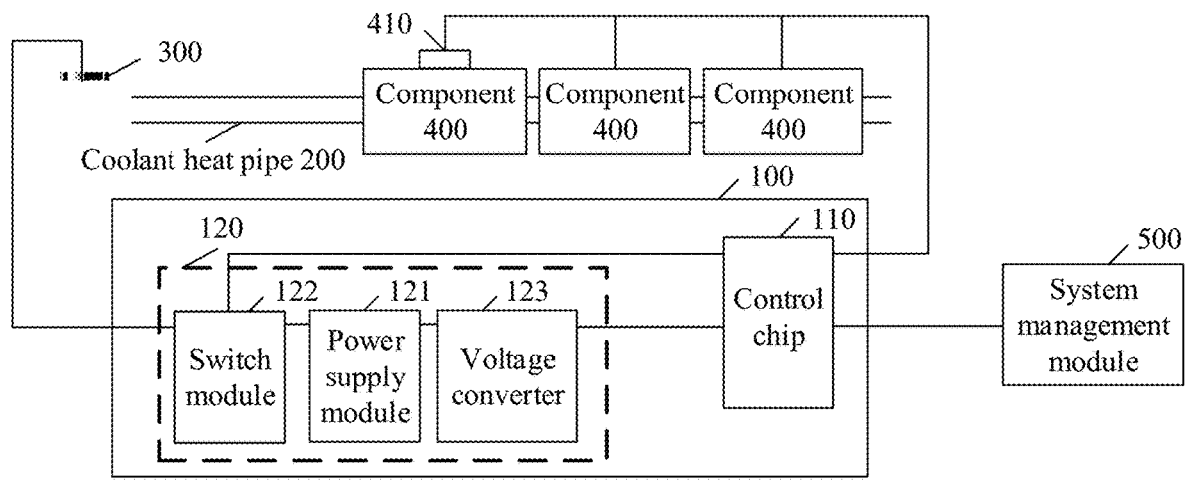
FIG. 4 is a schematic diagram of a structure of still another detection apparatus according to this application.

As shown in FIG. 4, the power supply circuit 120 may include the power supply module 121 and the switch module 122. The switch module 122 is separately connected to the power supply module 121 and the solenoid valve 300, and is located on the power supply line between the power supply module 121 and the solenoid valve 300. The control chip 110 may be connected to the switch module 122 and the power supply module 121. When the control chip 110 is connected to the power supply module 121, the control chip 110 may obtain power from the power supply module 121. When the control chip 110 is connected to the switch module 122, the control chip 110 may control the switch module 122, so as to further control the power supply line between the power supply module 121 and the solenoid valve 300 to be disconnected or closed.

If working voltages of the control chip 110 and the solenoid valve 300 are different, for example, if a working voltage of the control chip 110 is relatively low, a voltage converter 123 may be further disposed between the power supply module 121 and the control chip 110, and a voltage provided by the power supply module 121 is reduced to the working voltage of the control chip 110, so that the control chip 110 works normally.

The following describes a manner in which the control chip 110 determines whether the coolant heat pipe 200 or the solenoid valve 300 is abnormal based on a temperature difference. There are a plurality of manners in which the control chip 110 determines whether the coolant heat pipe 200 or the solenoid valve 300 is abnormal based on the temperature difference. Two manners are listed below:

Manner 1: After the control chip 110 controls the solenoid valve 300 to change from an open state to a closed state and a temperature of the component 400 is stable, the control chip 110 may obtain a first temperature difference of the component 400 and determine whether the coolant heat pipe 200 and the solenoid valve 300 are abnormal based on the first temperature difference. The first temperature difference is a temperature change value of the component 400 when the solenoid valve 300 changes from the open state to the closed state.

When the solenoid valve 300 is closed, the coolant in the coolant heat pipe 200 cannot flow, and heat of the component 400 cannot be dissipated, causing the temperature of the component 400 to increase. The control chip 110 may compare the first temperature difference with a first threshold, and determine whether the coolant heat pipe 200 and the solenoid valve 300 are abnormal based on a result of the comparison between the first temperature difference and the first threshold. A setting manner and a specific value of the first threshold are not limited in this embodiment of this application. The first threshold may be an empirical value, and the first threshold is related to a temperature change of the component 400 when heat of the component 400 is not dissipated.

It should be noted that a temperature change usually occurs in a period of time, and the control chip may control the solenoid valve 300 to be closed in a first period of time, obtain a temperature difference of the component 400 in the first period of time, and use the temperature difference as a first temperature difference.

If the first temperature difference is lower than the first threshold, it indicates that the first temperature difference is relatively small, and the temperature of the component 400 does not change greatly. This indicates that the coolant heat pipe 200 has coolant flowing inside, and the solenoid valve 300 is abnormal. For example, the solenoid valve 300 is closed incompletely, or the valve plug of the solenoid valve 300 is damaged.

If the first temperature difference is higher than the first threshold, it indicates that the first temperature difference is relatively large, and the temperature of the component 400 has changed greatly. This indicates that the coolant heat pipe 200 has no coolant flowing inside, and the solenoid valve 300 is normal.

A quantity of times of performing manner 1 is not limited herein. To be specific, the control chip 110 may close the solenoid valve 300 for a plurality of times, obtain a plurality of first temperature differences, calculate a first average temperature difference based on the first temperature differences obtained for a plurality of times, compare the first average temperature difference with a first threshold, and determine whether the solenoid valve 300 is abnormal based on a result of the comparison between the first average temperature difference and the first threshold.

Manner 2: After the control chip 110 controls the solenoid valve 300 to change from a closed state to an open state and a temperature of the component 400 is stable, the control chip 110 may obtain a second temperature difference of the component 400 and determine whether the coolant heat pipe 200 and the solenoid valve 300 are abnormal based on the second temperature difference. The second temperature difference is a temperature change value of the component 400 when the solenoid valve 300 changes from the closed state to the open state.

It can be learned from the foregoing content that when the solenoid valve 300 is closed, the coolant in the coolant heat pipe 200 cannot flow, causing the temperature of the component 400 to increase. Then, if the solenoid valve 300 is open, the coolant in the coolant heat pipe 200 should flow, and heat of the component 400 can be dissipated by using the flowing coolant, causing the temperature of the component 400 to decrease. The control chip 110 may compare the second temperature difference with a second threshold, and determine whether the coolant heat pipe 200 and the solenoid valve 300 are abnormal based on a result of the comparison between the second temperature difference and the second threshold. A setting manner and a specific value of the second threshold are not limited in this embodiment of this application. The second threshold may be an empirical value, and the second threshold is related to a temperature change of the component 400 when heat of the component 400 is normally dissipated.

It should be noted that a temperature change usually occurs in a period of time, and the control chip may control the solenoid valve 300 to be open in a second period of time, obtain a temperature difference of the component 400 in the second period of time, and use the temperature difference as a second temperature difference. A quantity of times of performing manner 2 is not limited herein. To be specific, the control chip 110 may close the solenoid valve 300 and then open the solenoid valve 300 for a plurality of times, obtain a plurality of second temperature differences, calculate a second average temperature difference based on the second temperature differences obtained for a plurality of times, compare the second average temperature difference with a second threshold, and determine whether the solenoid valve 300 is abnormal based on a result of the comparison between the second average temperature difference and the second threshold.

If the second temperature difference is lower than the second threshold, it indicates that the second temperature difference is relatively small, and the temperature of the component 400 does not change greatly. There are a plurality of cases in which the second temperature difference is relatively small. Two possible cases are listed below:

Case 1: When the solenoid valve 300 is closed, because the solenoid valve 300 is abnormal, the coolant heat pipe 200 has coolant flowing inside, and the temperature of the component 400 increases only slightly. Then, the solenoid valve 300 is open, and the flowing coolant inside the coolant heat pipe 200 may decrease the temperature of the component 400 only slightly, and therefore, the second temperature difference is relatively small.

Case 2: The solenoid valve 300 is closed, and then the solenoid valve 300 is open. Because the solenoid valve 300 or/and the coolant heat pipe 200 are abnormal, the flowing coolant is relatively little, and consequently cannot dissipate heat of the component 400 in a timely manner. As a result, the temperature difference of the component 400 is relatively small.

There are a plurality of cases in which the solenoid valve 300 or/and the coolant heat pipe 200 are abnormal. For example, the solenoid valve 300 is blocked by a foreign matter, the coolant heat pipe 200 is blocked by a foreign matter, and the coolant heat pipe 200 leaks. All cases in which an exception in the solenoid valve 300 or/and the coolant heat pipe 200 can reduce the flowing coolant are applicable to this embodiment of this application.

In any of the foregoing cases, the second temperature difference is lower than the second threshold, indicating that the coolant heat pipe 200 or the solenoid valve 300 is abnormal.

If the second temperature difference is higher than the second threshold, it indicates that the second temperature difference is relatively large, and the temperature of the component 400 has changed greatly. This indicates that the coolant heat pipe 200 has coolant flowing inside, and a flow rate of the coolant is within a normal range.

This embodiment of this application is not limited to the foregoing two manners. The foregoing two manners may be alternatively used in combination. For example, the control chip 110 may first control the solenoid valve 300 to be closed to obtain a first temperature difference, and then control the solenoid valve 300 to be open to obtain a second temperature difference. The control chip 110 compares the first temperature difference with a first threshold, and compares the second temperature difference with a second threshold. If the second temperature difference is lower than the second threshold, it indicates that the solenoid valve 300 and/or the coolant heat pipe 200 is abnormal. In this case, if the first temperature difference is lower than the first threshold, it indicates that the solenoid valve 300 is abnormal, and if the first temperature difference is higher than the first threshold, it indicates that the solenoid valve 300 is normal. A reason for the case in which the second temperature difference is lower than the second threshold is that the coolant heat pipe 200 is abnormal. If the second temperature difference is higher than the second threshold, it may indicate that both the solenoid valve 300 and the coolant heat pipe 200 are normal.

After determining that the coolant heat pipe 200 or the solenoid valve 300 is abnormal, the control chip 110 sends first alarm information to the system management module 500, where the first alarm information indicates that the coolant heat pipe 200 or the solenoid valve 300 is abnormal.

For example, after determining that the solenoid valve 300 is abnormal, the control chip 110 may send first alarm information indicating that the solenoid valve 300 is abnormal to the system management module 500. After determining that the coolant heat pipe 200 is abnormal, the control chip 110 may send first alarm information indicating that the coolant heat pipe 200 is abnormal to the system management module 500. If the control chip 110 cannot accurately determine which of the solenoid valve 300 and the coolant heat pipe 200 is abnormal, the control chip 110 may send first alarm information indicating that the solenoid valve 300 or the coolant heat pipe 200 is abnormal to the system management module 500.

The control chip 110 may spontaneously detect, in the foregoing manners, whether the coolant heat pipe 200 or the solenoid valve 300 is abnormal. For example, the control chip 110 may periodically and actively detect whether the coolant heat pipe 200 or the solenoid valve 300 in the device is abnormal.

Alternatively, the control chip 110 may be triggered by a control signal to detect whether the coolant heat pipe 200 or the solenoid valve 300 in the device is abnormal. For example, after receiving a control signal sent by the system management module 500, the control chip 110 may detect whether the coolant heat pipe 200 or the solenoid valve 300 in the device is abnormal, and the control signal indicates the control chip 110 to detect whether the coolant heat pipe 200 and the solenoid valve 300 in the device are abnormal.

In an embodiment, the detection apparatus 100 may further include a detection coil 130, and the detection coil can detect whether the coolant heat pipe 200 in the device leaks. The control chip 110 may detect whether the detection coil 130 is faulty. For example, the detection coil 130 includes a first coil 131 and a second coil 132 that are connected in parallel, and the control chip 110 may determine whether the detection coil 130 is faulty by detecting a voltage difference between the first coil 131 and the second coil 132.

Figure 5A:
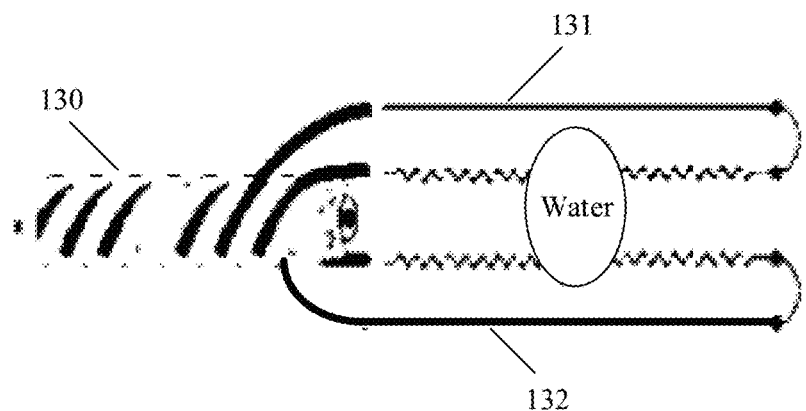
FIG. 5A is a schematic diagram of a structure of a detection coil according to this application.

FIG. 5A is a schematic diagram of the detection coil 130 disposed inside the device. The detection coil 130 includes two parallel coils, where the first coil 131 and the second coil 132 are identified, and the two parallel coils are wound together. The detection coil 130 is disposed near the coolant heat pipe 200. When the first coil 131 and the second coil 132 leak, the first coil 131 and the second coil 132 are short-circuited, and further, a voltage difference or a current between the first coil 131 and the second coil 132 is changed. A voltage difference or a current at one end of the first coil 131 and one end of the second coil 132 may be used to detect whether the coolant heat pipe 200 leaks.

The control chip 110 may detect a working state of the detection coil 130 by detecting a voltage difference between the other end of the first coil 131 and the other end of the second coil 132 in the coil.

When the detection coil 130 works normally, working voltages of the first coil 131 and the second coil 132 are generally constant. Correspondingly, a voltage difference between the other end of the first coil 131 and the other end of the second coil 132 is generally a fixed value. If the detection coil 130 is faulty, for example, if the first coil 131 or the second coil 132 is broken, a voltage of the first coil 131 or the second coil 132 is changed. The voltage difference between the other end of the first coil 131 and the other end of the second coil 132 is no longer a fixed value, but is changed to another value.

The control chip 110 may separately detect a voltage at the other end of the first coil 131 and a voltage at the other end of the second coil 132, so as to determine a voltage difference between the other end of the first coil 131 and the other end of the second coil 132, and determine whether the detection coil 130 is faulty based on the voltage difference.

The control chip 110 may alternatively detect a voltage difference between the other end of the first coil 131 and the other end of the second coil 132 when the first coil 131 and the second coil 132 are short-circuited. That the first coil 131 and the second coil 132 are short-circuited means that the first coil 131 and the second coil 132 are interconnected. In a case of the short circuit, the first coil 131 and the second coil 132 are connected in series, and a voltage difference between the first coil 131 and the second coil 132 should be zero. If the voltage difference between the first coil 131 and the second coil 132 is not zero in a case of the short circuit, it indicates that the first coil 131 or the second coil 132 may be broken, and the detection coil 130 is faulty. After determining that the detection coil 130 is faulty, the control chip 110 may send second alarm information to the system management module 500, so as to notify the system management module 500 that the detection coil 130 is faulty.

If the voltage difference between the first coil 131 and the second coil 132 is zero, it indicates that the first coil 131 or the second coil 132 is not broken, and the detection coil 130 is normal. After determining that the detection coil 130 is normal, the control chip 110 may send indication information to the system management module 500, so as to notify the system management module 500 that the detection coil 130 is normal.

Figure 5B:
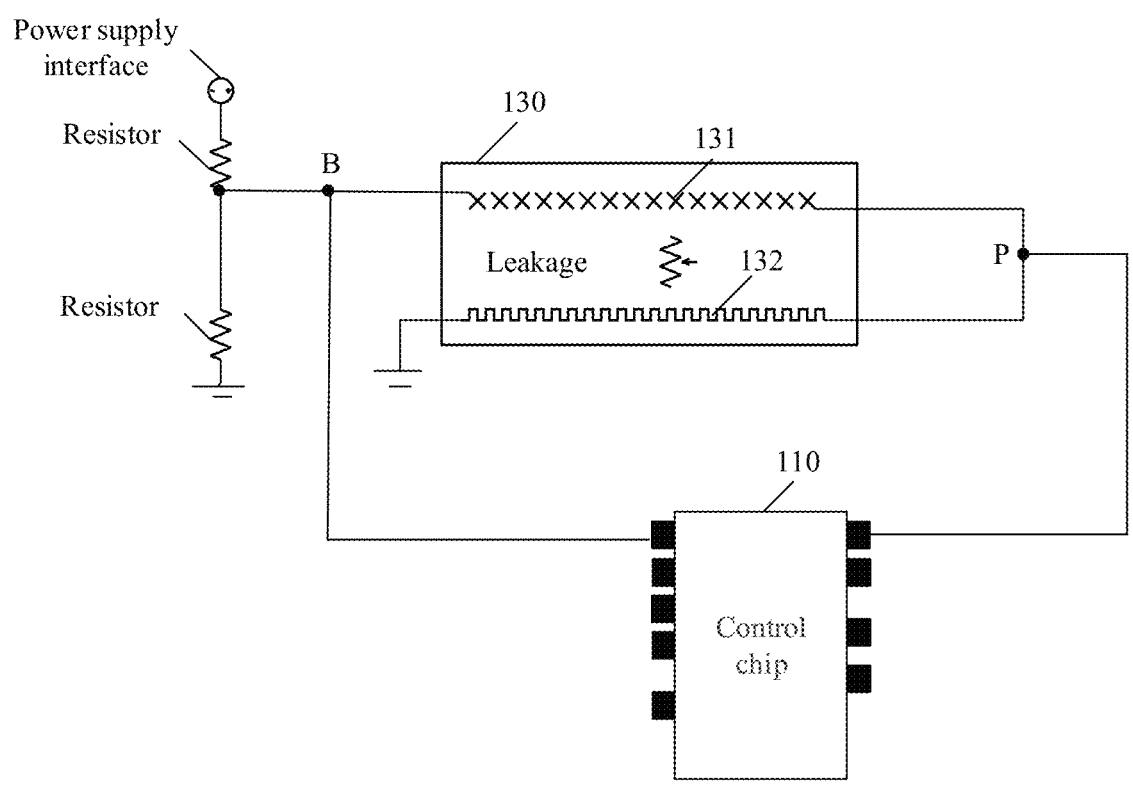
FIG. 5B is a schematic diagram of a connection between a detection coil and a control chip according to this application.

For example, as shown in FIG. 5B, at the other end of the detection coil 130, the first coil 131 is connected to the second coil 132, and a connection point is P. The control chip 110 is connected to the point P, and a voltage at the point P is a voltage difference between the first coil 131 and the second coil 132 when the first coil 131 and the second coil 132 are short-circuited.

Connecting the first coil 131 and the second coil 132 at the other end of the detection coil 130 is equivalent to making the first coil 131 and the second coil 132 short-circuited at the other end of the detection coil 130. If the detection coil 130 can work normally, a voltage difference between the first coil 131 and the second coil 132 should be zero when the first coil 131 and the second coil 132 are short-circuited. If the control chip 110 detects that a voltage at the point P is zero, it may be determined that the detection coil 130 can work normally. If the detection coil 130 cannot work normally, for example, if any one of the first coil 131 and the second coil 132 is faulty, for example, if a coil is broken, a voltage difference between the first coil 131 and the second coil 132 is not equal to zero when the first coil 131 and the second coil 132 are short-circuited. If the control chip 110 detects that a voltage at the point P is not zero, it may be determined that the detection coil 130 cannot work normally.

In an embodiment, the control chip 110 may detect a voltage difference between the first coil 131 and the second coil 132 at both ends of the detection coil 130 in a manner of connecting the first coil 131 and the second coil 132. A voltage difference (for example, a voltage at a point B is checked) between the first coil 131 and the second coil 132 at one end of the detection coil 130 may be used as a leakage analog signal, and the leakage analog signal may indicate a leakage of the coolant heat pipe 200. A voltage difference between the first coil 131 and the second coil 132 at the other end of the detection coil 130 may be used as a self-test signal for detecting whether the signal works normally.

When the control chip 110 determines that the detection coil 130 is normal and a second temperature difference is lower than a second threshold, if the control chip 110 does not receive the leakage detection signal, it indicates that the coolant heat pipe does not leak currently. A reason for the case in which the second temperature difference is lower than the second threshold may be that the solenoid valve 300 or the coolant heat pipe 200 is blocked by a foreign matter. In this case, first alarm information may indicate that the solenoid valve 300 or the coolant heat pipe 200 is blocked by a foreign matter.

Figure 6:
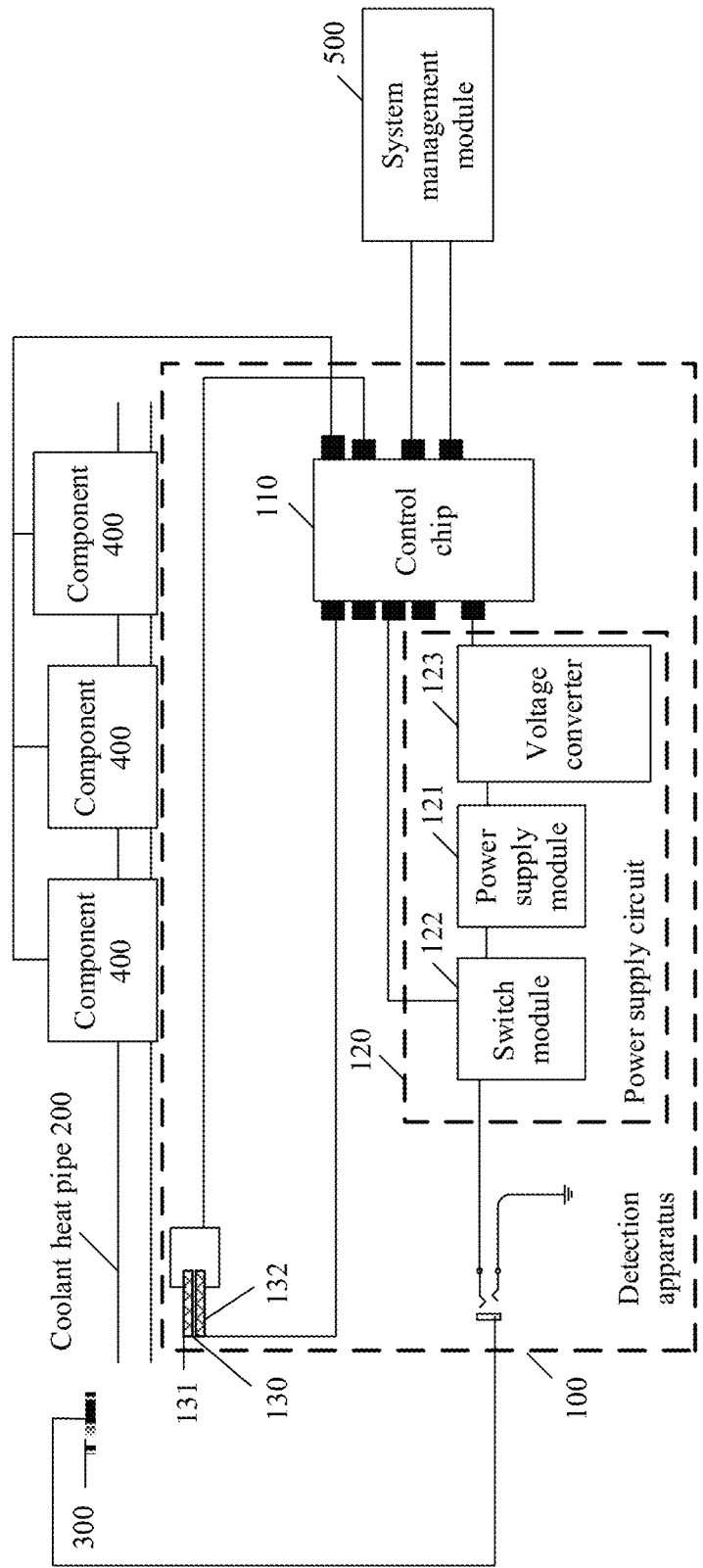
FIG. 6 is a schematic diagram of a structure of yet another detection apparatus according to this application.

With reference to the foregoing embodiment, a detection apparatus 100 according to an embodiment of this application is described below. Refer to FIG. 6. The detection apparatus 100 includes a control chip 110 and a power supply circuit 120. Optionally, the detection apparatus 100 may further include a detection coil 130. The power supply circuit 120 is connected to a solenoid valve 300 and the control chip 110, and can supply power to the solenoid valve 300 and the control chip 110. The control chip 110 is connected to a system management module 500, and a signal (such as a first alarm signal and a control signal) may be transmitted between the control chip 110 and the system management module 500.

The power supply circuit 120 includes a switch module 122, a power supply module 121, and a voltage converter 123. The power supply module 121 is connected to the solenoid valve 300 by using the switch module 122, the switch module 122 is connected to the control chip 110, and the power supply module 121 is connected to the control chip 110 by using the voltage converter 123, to supply power to the control chip 110.

A pin of the control chip 110 is connected to any coil in the detection coil 130, the control chip 110 may obtain a leakage analog signal. Another pin of the control chip 110 is connected to both the first coil 131 and the second coil 132, the control chip 110 may detect a voltage difference between the first coil 131 and the second coil 132 in the detection coil 130.

Another pin of the control chip 110 is connected to components 400, the control chip 110 may obtain temperatures of the components 400.

In the detection apparatus 100 shown in FIG. 6, the control chip 110 controls a working state of the solenoid valve 300 by controlling a power supply state of the power supply circuit 120 for the solenoid valve 300. When controlling the working state of the solenoid valve 300, the control chip 110 may obtain temperature differences of the components 400, and determine whether the solenoid valve 300 and the coolant heat pipe 200 are abnormal based on the temperature differences. If the solenoid valve 300 or the coolant heat pipe 200 is abnormal, the control chip 110 may send first alarm information to the system management module 500, to notify the system management module 500 that the solenoid valve 300 or the coolant heat pipe 200 is abnormal. The control chip 110 may further detect a voltage difference between the first coil 131 and the second coil 132 in the detection coil 130. When detecting that the voltage difference between the first coil 131 and the second coil 132 is not zero, the control chip 110 may send second alarm information to the system management module 500, to notify the system management module 500 that the detection coil 130 is faulty.

It should be noted that embodiments provided in this application are merely examples. A person skilled in the art may be clearly aware that for convenience and conciseness of description, in the foregoing embodiments, descriptions of embodiments are separately focused, and for a part not described in detail in one embodiment, refer to related descriptions of another embodiment. Features disclosed in embodiments, the claims, and accompanying drawings in the present disclosure may independently exist, or may exist in a combination manner. Features described in a hardware form in embodiments of the present disclosure may be executed by software, and features described in a software form in embodiments of the present disclosure may be executed by hardware. This is not limited herein.

What is claimed is:

1. A detection apparatus, wherein the apparatus is configured to detect whether a coolant heat pipe in a device or a solenoid valve on the coolant heat pipe is abnormal, and the apparatus comprises a control chip; and
the control chip is configured to:
control the solenoid valve to change from an open state to a closed state, and obtain a first temperature difference of the component in the device after a temperature of the component in the device is stable in the closed state; and
control the solenoid valve to change from the closed state to the open state, and obtain a second temperature difference of the component in the device after the temperature of the component in the device is stable in the open state;
determine that the coolant heat pipe is abnormal and that the solenoid valve is normal based on the second temperature difference being detected as being lower than a second threshold value and the first temperature difference being detected as being greater than a first threshold value; and
determine that the solenoid valve is abnormal based on the second temperature difference being detected as being lower than the second threshold value and the first temperature difference being detected as being lower than the first threshold value.

2. The apparatus according to claim 1, wherein the apparatus further comprises a power supply circuit, and the power supply circuit is configured to supply power to the solenoid valve and the control chip; and
the control chip is configured to: control a power supply state of the power supply circuit for the solenoid valve.

3. The apparatus according to claim 2, wherein when the power supply circuit supplies power to the solenoid valve, the solenoid valve is in the open state; and when the power supply circuit interrupts power to the solenoid valve, the solenoid valve is in the closed state.

4. The apparatus according to claim 2, wherein when the power supply circuit interrupts power to the solenoid valve, the solenoid valve is in the open state; and when the power supply circuit supplies power to the solenoid valve, the solenoid valve is in the closed state.

5. The apparatus according to claim 1, wherein the control chip is further configured to: after determining that the coolant heat pipe or the solenoid valve is abnormal, send first alarm information to a system management module in the device, wherein the first alarm information is used to indicate that the coolant heat pipe or the solenoid valve is abnormal.

6. The apparatus according to claim 1, wherein the control chip is further configured to: receive a control signal from a system management module in the device, wherein the control signal is used to indicate to the control chip to detect whether the coolant heat pipe and the solenoid valve on the coolant heat pipe in the device are abnormal.

7. The apparatus according to claim 5, wherein the apparatus further comprises a detection coil, and the detection coil is configured to detect whether the coolant heat pipe in the device leaks; and the control chip is connected to the detection coil, and is further configured to detect whether the detection coil is faulty.

8. The apparatus according to claim 7, wherein the detection coil comprises a first coil and a second coil that are connected in parallel; and the control chip is configured to: detect a voltage difference between the first coil and the second coil when the first coil and the second coil are short-circuited, and send second alarm information to the system management module if the voltage difference is not zero, wherein the second alarm information is used to indicate that the detection coil is faulty.

9. The apparatus according to claim 7, wherein the control chip is further configured to send indication information to the system management module if the voltage difference is zero, wherein the indication information is used to indicate that the detection coil is normal.

10. The apparatus according to claim 7, wherein the control chip is further configured to receive a leakage analog signal using the detection coil, wherein the leakage analog signal is used to indicate that the coolant heat pipe leaks.

11. A server, comprising a component, a coolant heat pipe, a solenoid valve on the coolant heat pipe, and a detection apparatus, wherein the detection apparatus is configured to detect whether the coolant heat pipe or the solenoid valve on the coolant heat pipe is abnormal, and the apparatus comprises a control chip; and
the control chip is configured to:
control the solenoid valve to change from an open state to a closed state, and obtain a first temperature difference of the component in the device after a temperature of the component in the device is stable in the closed state; and
control the solenoid valve to change from the closed state to the open state, and obtain a second temperature difference of the component in the device after the temperature of the component in the device is stable in the open state;
determine that the coolant heat pipe is abnormal and that the solenoid valve is normal based on the second temperature difference being detected as being lower than a second threshold value and the first temperature difference being detected as being greater than a first threshold value; and
determine that the solenoid valve is abnormal based on the second temperature difference being detected as being lower than the second threshold value and the first temperature difference being detected as being lower than the first threshold value.

12. The server according to claim 11, wherein the detection apparatus further comprises a power supply circuit, and the power supply circuit is configured to supply power to the solenoid valve and the control chip; and
the control chip is configured to: control a power supply state of the power supply circuit for the solenoid valve.

13. The server according to claim 12, wherein when the power supply circuit supplies power to the solenoid valve, the solenoid valve is in the open state; and when the power supply circuit interrupts power to the solenoid valve, the solenoid valve is in the closed state.

14. The server according to claim 12, wherein when the power supply circuit interrupts power to the solenoid valve, the solenoid valve is in the open state; and when the power supply circuit supplies power to the solenoid valve, the solenoid valve is in the closed state.

15. The server according to claim 11, wherein the control chip is further configured to: after determining that the coolant heat pipe or the solenoid valve is abnormal, send first alarm information to a system management module in the device, wherein the first alarm information is used to indicate that the coolant heat pipe or the solenoid valve is abnormal.

16. The server according to claim 11, the control chip is further configured to: receive a control signal from a system management module in the device, wherein the control signal is used to indicate to the control chip to detect whether the coolant heat pipe and the solenoid valve on the coolant heat pipe in the device are abnormal.

17. The detection apparatus according to claim 1, wherein the component is a component in the apparatus other than the solenoid valve and the coolant heat pipe.

18. The server according to claim 11, wherein the component is a component in the apparatus other than the solenoid valve and the coolant heat pipe.

* * * * *